W. A. CHASE.
REFRIGERATOR.
APPLICATION FILED JUNE 5, 1909.
1,001,505.
Patented Aug. 22, 1911.
2 SHEETS—SHEET 1.
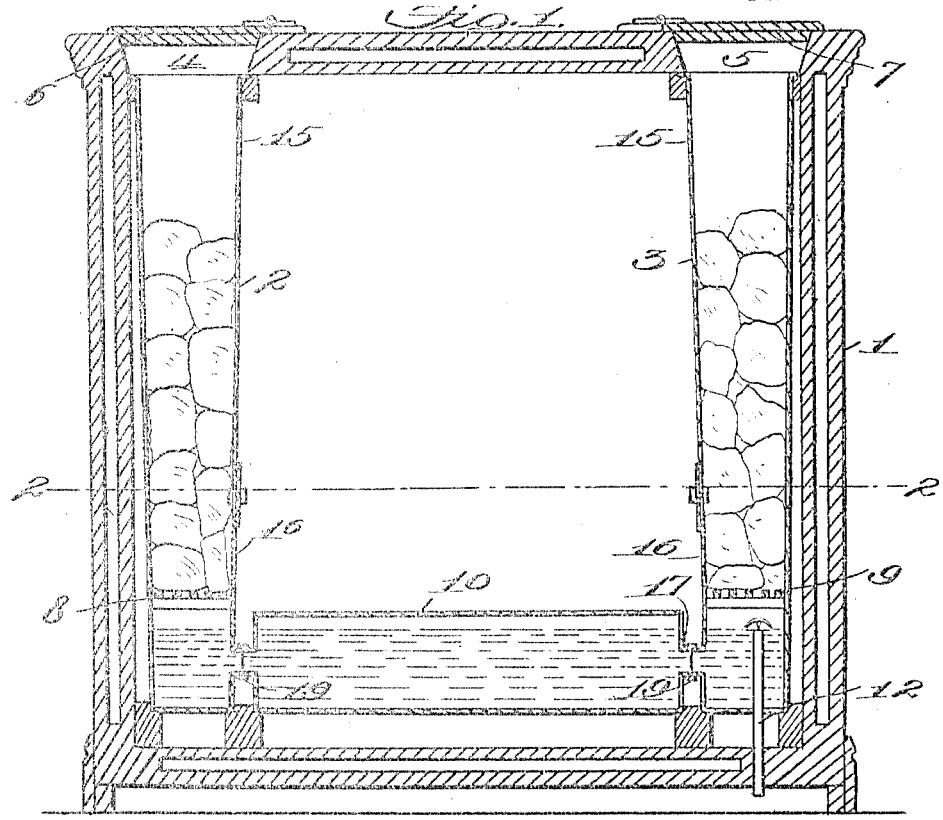
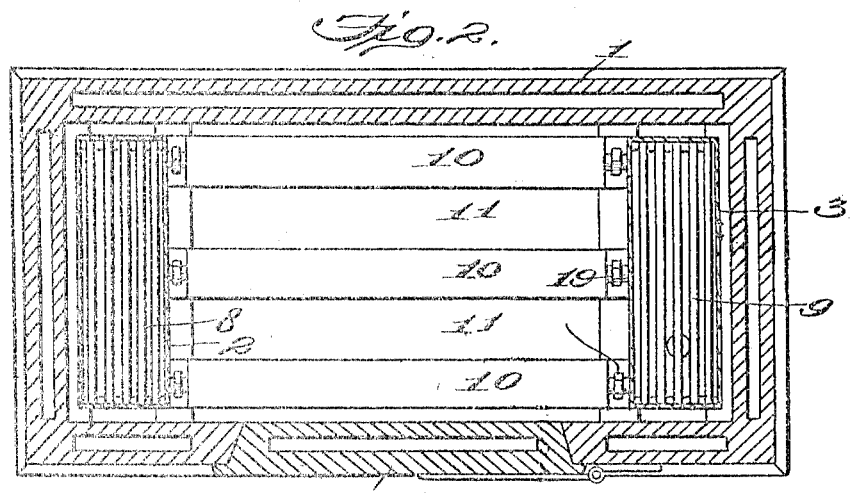
Witnesses:
Inventor
Warren A. Chase
By James L. Norris
Atty W. A. CHASE.
REFRIGERATOR.
APPLICATION FILED JUNE 5, 1909.
1,001,505.
Patented Aug. 22, 1911.
2 SHEETS—SHEET 2.
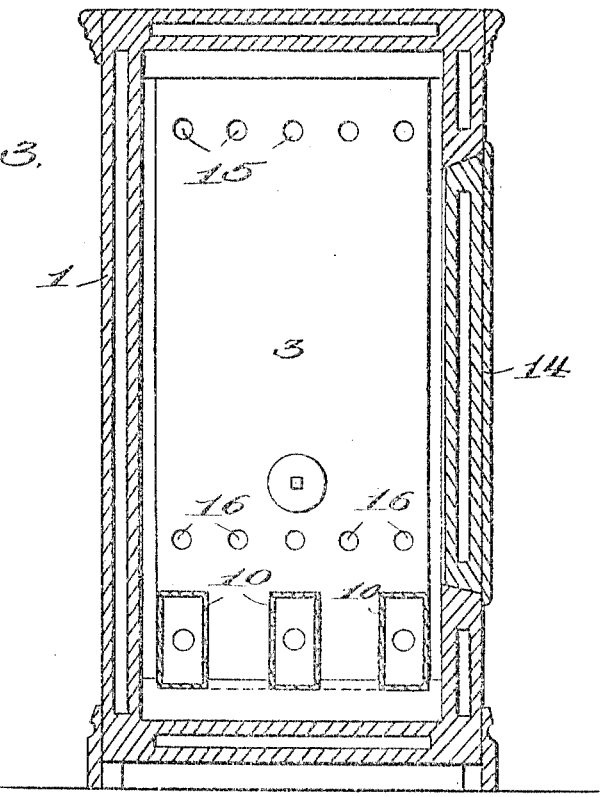
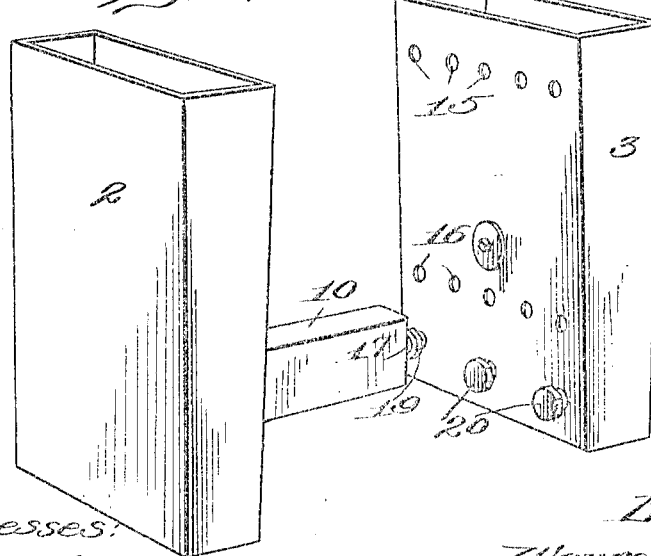
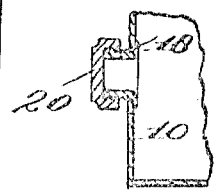

UNITED STATES PATENT OFFICE.

WARREN A. CHASE, OF DORCHESTER, MASSACHUSETTS, ASSIGNOR OF ONE-HALF TO FRANK B. CRANE, OF DORCHESTER, MASSACHUSETTS.

REFRIGERATOR.

1,001,505.  Specification of Letters Patent.  Patented Aug. 22, 1911.

Application filed June 5, 1909. Serial No. 500,409.

*To all whom it may concern:*

Be it known that I, WARREN A. CHASE, a citizen of the United States, residing at Dorchester, in the county of Suffolk and State of Massachusetts, have invented new and useful Improvements in Refrigerators, of which the following is a specification.

My present invention relates to improvements in refrigerators or cooling apparatus for animal and vegetable matters of various kinds, and it has for its object primarily to provide an improved apparatus of this character which embodies ice containing tanks for producing a flow of refrigerater air through a provision chamber such as adapted to receive meats, vegetables and provisions of various kinds, in connection with a collecting tank or tanks, the latter being arranged at the bottom of the refrigerator and adapted to receive the cooled drip water from the melting ice in the ice tanks, the waste products of the ice tanks being thereby further utilized before they pass off through the waste pipe.

Another object of the invention is to provide collecting tanks which extend longitudinally and in substantially parallel relation between the ice tanks and across the bottom of the provision chamber, these collecting tanks serving not only to refrigerate the provisions in the provision chamber, but also forming spaces between them adapted to receive milk bottles, cans and other articles which should be maintained at a comparatively low and constant temperature, the collecting tanks receiving the salted drip water from the ice tanks and thereby constituting brine receiving tanks.

A further object of the invention is to provide improved means for mounting the brine receiving or collecting tanks whereby any number thereof may be removed or replaced in order to accommodate a greater or less number of bottles or cans in the bottom of the refrigerator, suitable devices being provided for coupling the collecting tanks to the ice tanks in order that they may receive the salted drip water from the latter and utilize this refrigerated drip water before it escapes to the waste pipe.

To these and other ends, the invention consists in certain improvements, and combinations and arrangements of parts, all as will be hereinafter more fully described, the novel features being pointed out particularly in the claims at the end of the specification.

In the accompanying drawing: Figure 1 represents a longitudinal vertical section of a refrigerator constructed in accordance with my present invention; Fig. 2 represents a horizontal section taken on the line 2—2 of Fig. 1; Fig. 3 represents a transverse vertical section of the refrigerator; Fig. 4 is a perspective view of the ice tanks and the collecting tanks, these tanks being shown removed from the refrigerator. Fig. 5 is a detail sectional view showing a closing cap applied to one of the upright ice tanks.

Similar parts are designated by the same reference characters in the several views.

Refrigerators or cooling apparatus constructed in accordance with my present invention may be made in various sizes and modified so as to be adapted for use either in the household, in stores or in refrigerator cars. In the present instance I have shown one embodiment of my invention which discloses the same as applied to an ordinary stationary refrigerator, the apparatus comprising generally an outer receptacle or casing 1 which is preferably formed with double walls having the space between them filled with saw-dust or other heat insulating material in order that the conductivity of heat from the exterior to the interior of the refrigerator is minimized. Mounted within the receptacle or casing and at the opposite ends thereof are a pair of vertically arranged tanks 2 and 3 which may be composed of galvanized iron or other appropriate material, and these tanks are adapted to contain salt and ice. These tanks are preferably arranged in parallel vertical planes as shown, the upper ends of the two tanks being open and registering with corresponding openings 4 and 5 formed in the top of the refrigerator, and these openings are normally closed by suitably hinged covers or doors 6 and 7 through which the ice and salt may be introduced into the respective tanks. The bottom of each tank is provided with an ice support 8 or 9, these supports being preferably composed of slats or racks which permit the salt water dripping from the melting ice to pass from the tank. These vertically extending salt and ice tanks at the opposite ends of the refrigerator inclose two sides of a provision chamber, the proximate walls of the tanks serving as the two end walls of such chamber, and the ice tanks form in effect air circulating flues. In order to insure a proper circulation of the refrigerated air from the ice tanks into the provision chamber and then back into the ice tanks, the proximate walls of the latter are provided with rows of upper and lower openings 15 and 16, the refrigerated air descending to the bottom of the ice tanks pouring out through the opening 16 into the provision chamber, and as this refrigerated air takes up heat from the provisions within said chamber, it will rise and re-enter the upper portions of the ice tanks through the openings 15.

Extending horizontally beneath the provision chamber and between the salt and ice tanks are a set of collecting tanks 10 which are adapted to receive and contain the brine. Any suitable number of these collecting tanks may be employed. For instance, in those cases where it is desirable to provide a relatively large storage space below the provision chamber, one or more of these collecting tanks may be used. In the present instance a series of three collecting tanks 10 are shown, these tanks extending horizontally and in parallel relation beneath the provision chamber and forming between them spaces 11 adapted for the reception of milk bottles, cans and other articles which it is desirable or necessary to maintain at a relatively low temperature. These collecting tanks are suitably connected at their opposite ends to the respective salt and ice tanks and have communication therewith in order that the salty drip water from the melting ice in these tanks may be received by the collecting tanks, the drip water thus flowing into these tanks serving to provide a constant supply of brine solution at a low temperature. The brine solution in the collecting tanks is maintained at a constant level by means of a waste pipe 12 which extends upwardly through the bottom of the refrigerator and has its upper end opening at the level of the brine solution.

In some cases, such as in the transportation of milk cans in large quantities, it may be desirable to remove some of these collecting tanks so as to provide additional space available for the storage of such cans, a single collecting tank in that instance being sufficient. In order to provide for such removal of certain of the collecting tanks, these tanks are removably fitted into the space beneath the storage chamber, suitable fluid-tight connections being provided between the opposite ends of the respective collecting tanks and the ice tanks, and suitable devices being used to cut off such connections after the removal of the corresponding collecting tanks.

In the present instance, the opposite ends of each collecting tank are closed by end walls, and to these end walls are fitted nipples 17 which are adapted to be brought into alinement with a corresponding pair of externally threaded nipples 18 arranged on the inner walls of the ice tanks 2 and 3, and the necessary liquid-tight joint is provided by means of the sleeves or collars 19. When one or more of the collecting tanks are removed, caps 20 may be fitted on the nipples of the ice tank to prevent the escape of the liquid therefrom. The detachable connecting devices between the ice and collecting tanks are shown, however, in the present instance as merely one embodiment of the invention, and it will be understood that connecting devices of any suitable kind may be employed. In order to permit access to the provision chamber and to the storage spaces in the bottom thereof between the collecting tanks, a suitably located door 14 may be provided in one of the walls of the refrigerator between the two salt and ice tanks.

A refrigerator or cooling apparatus constructed in accordance with my invention is comparatively simple in construction, and as the ice is used initially to cool the provisions or other articles contained in the upper provision chamber, while the refrigerated water dripping from the melting ice is utilized in maintaining the collecting tanks at a very low temperature, the refrigerator obviously utilizes the ice to the greatest advantage, and the construction of the tanks is such that they may be readily adapted for use in connection with refrigerators or cooling apparatus of various kinds.

I claim as my invention:—

1. A refrigerator comprising a suitable outer casing, a pair of vertically arranged ice tanks supported in opposed relation and at opposite ends of the casing, such ice tanks being spaced apart sufficiently to form a main provision chamber between them, the proximate walls of such tanks serving as the end walls for such provision chamber, each ice tank having an ice support spaced above its bottom and forming a brine chamber in such tank below the ice support, and a set of collecting tanks extending longitudinally across the bottom of the provision chamber and connected at their ends to the brine chambers formed in the bottoms of the respective ice tanks to receive and hold the brine mixture resulting from the melting of the ice in the ice tanks, said collecting tanks being located on the same level with the brine chambers of the ice tanks and below the ice containing portions of the latter and forming supplemental provision storage chambers between them adapted to hold articles or provisions requiring a lower temperature than is afforded by the main provision chamber.

2. A refrigerator comprising a suitable casing, a pair of vertically arranged ice tanks mounted in opposed relation within the casing and at the opposite ends thereof, the proximate walls of said tanks constituting end walls for an interposed main provision chamber, said walls being provided with rows of upper and lower openings for inducing an air circulation through the ice tanks and provision chamber, ice supports in the ice tanks spaced above the bottoms thereof and forming brine chambers in the ice tanks below the ice supports therein, a horizontal row of brine collecting tanks extending in parallel relation across the bottom of the main provision chamber and forming supplemental low temperature provision storage chambers between them, said brine collecting tanks being located wholly below the level of said ice supports and on the same level with said brine chambers, means for interchangeably coupling the opposite ends of each brine collecting tank to the brine chambers of the respective ice tanks whereby such brine collecting tanks may receive and hold the brine mixture from such tanks, and means for automatically maintaining a predetermined volume of brine in said brine collecting tanks and brine chambers.

In testimony whereof I have hereunto set my hand in presence of two subscribing witnesses.

WARREN A. CHASE.

Witnesses:
 GERTRUDE K. DONOVAN,
 EDITH M. WINCHESTER.